(12) United States Patent
Chen et al.

(10) Patent No.: US 7,149,392 B2
(45) Date of Patent: Dec. 12, 2006

(54) ROUND MULTI-FIBER CABLE ASSEMBLY AND A METHOD OF FORMING SAME

(75) Inventors: Wenzong Chen, Naperville, IL (US); Thomas Schiltz, Bolingbrook, IL (US); Igor Grois, Northbrook, IL (US)

(73) Assignee: Molex Incorporated, Lisle, IL (US)

( * ) Notice: Subject to any disclaimer, the term of this patent is extended or adjusted under 35 U.S.C. 154(b) by 23 days.

(21) Appl. No.: 10/930,022

(22) Filed: Aug. 30, 2004

(65) Prior Publication Data

US 2006/0045429 A1    Mar. 2, 2006

(51) Int. Cl.
*G02B 6/44*    (2006.01)
*G02B 6/36*    (2006.01)

(52) U.S. Cl. .................... 385/100; 385/88; 385/102; 385/113; 385/114

(58) Field of Classification Search ............ 385/50–76, 385/87, 88, 100, 114, 134, 138, 89–95
See application file for complete search history.

(56) References Cited

U.S. PATENT DOCUMENTS

| | | | | |
|---|---|---|---|---|
| 4,496,215 A | * | 1/1985 | Shaheen et al. ............ 385/114 |
| 4,595,265 A | * | 6/1986 | Hodgson et al. ............ 359/383 |
| 6,422,760 B1 | * | 7/2002 | Matasek et al. ............ 385/60 |
| 6,510,273 B1 | * | 1/2003 | Ali et al. .................... 385/136 |
| 6,623,173 B1 | * | 9/2003 | Grois et al. ................. 385/76 |
| 2002/0164130 A1 | * | 11/2002 | Elkins et al. ................. 385/87 |

* cited by examiner

*Primary Examiner*—John D. Lee
*Assistant Examiner*—Rhonda S. Peace
(74) *Attorney, Agent, or Firm*—Romi N. Bose (57) ABSTRACT

A method of forming a round multi-fiber cable assembly is provided which includes the following steps: providing a round multi-fiber cable, a heat shrinkable tube, a tubing, a boot, a crimp tubing, and a multi-fiber connector; threading the heat shrinkable tube onto the multi-fiber cable; stripping off inner and outer jackets of the multi-fiber cable to pre-determined lengths; ribbonizing the fibers of the multi-fiber cable, if necessary; preparing the tubing as required; threading the fibers and strength members of the multi-fiber cable through the tubing; placing the boot and the crimp tubing on the tubing, assembling the multi-fiber connector to the ribbon; crimping the crimp tubing around the tubing, the strength members and the multi-fiber connector; heat shrinking the heat-shrinkable tubing to the round multi-fiber cable and the tubing; and sliding the boot to attach it to the multi-fiber connector to provide a round multi-fiber cable assembly.

9 Claims, 10 Drawing Sheets

ROUND MULTI-FIBER CABLE ASSEMBLY AND A METHOD OF FORMING SAME

FIELD OF THE INVENTION

The invention relates to connectorization, or termination, of multi-fiber cables for fiber optic communications. More particularly, the invention relates to termination of round, jacketed multi-fiber cables to connectors that accept ribbon cables, such as the MTO connector.

BACKGROUND OF THE INVENTION

Figures 1, 2:
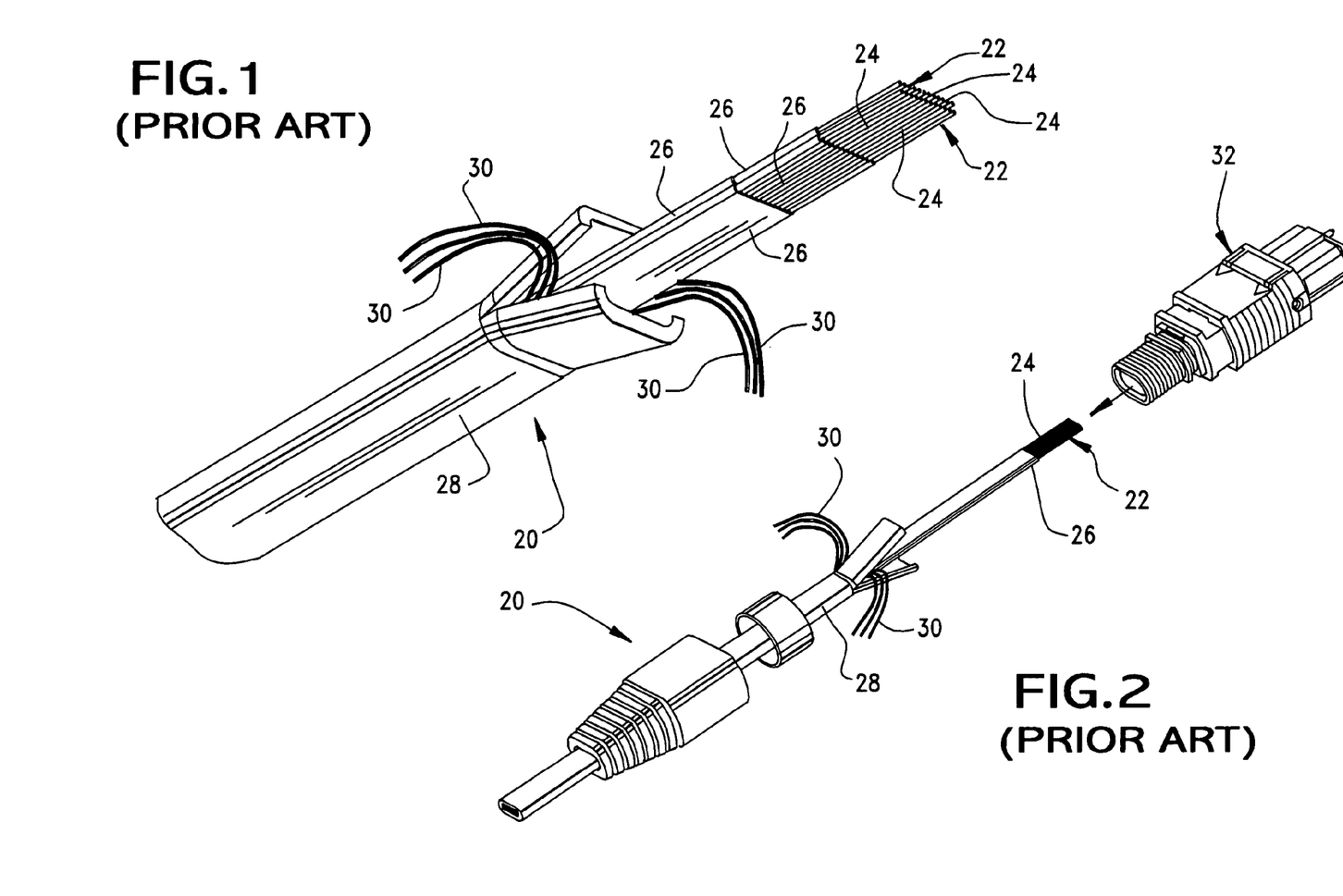
FIG. 1 is a perspective view of a flat ribbon cable of the prior art.
FIGS. 2–4 are perspective view illustrating the flat ribbon cable of the prior art being terminated with a multi-fiber connector to form a flat cable assembly of the prior art.

Ribbon cables contain many fibers that are embedded in a plastic material in parallel, forming a flat ribbon-like structure. Ribbon cables are used directly in friendly environments without any further protection or reinforcement. For many other applications, one or more ribbons are packaged with strength members, such as kevlar, in a PVC jacket for protection and easy handling. Such a ribbon cable 20 is illustrated in FIG. 1. The ribbon cable 20 contains two 12-fiber ribbons 22, which are formed by fibers 24 embedded in coatings 26. The 12-fiber ribbons 22 are packaged within the jacket 28 with strands 30 of strength members. The jacket 28 is a tubing of a rectangular cross section, which will be referred to as "flat" cable because the small thickness/width ratio of the cross section. Thus, ribbon cable 20 is relatively thin. Presently, almost all jacketed ribbon cables in applications are flat cables.

Figures 3, 4:
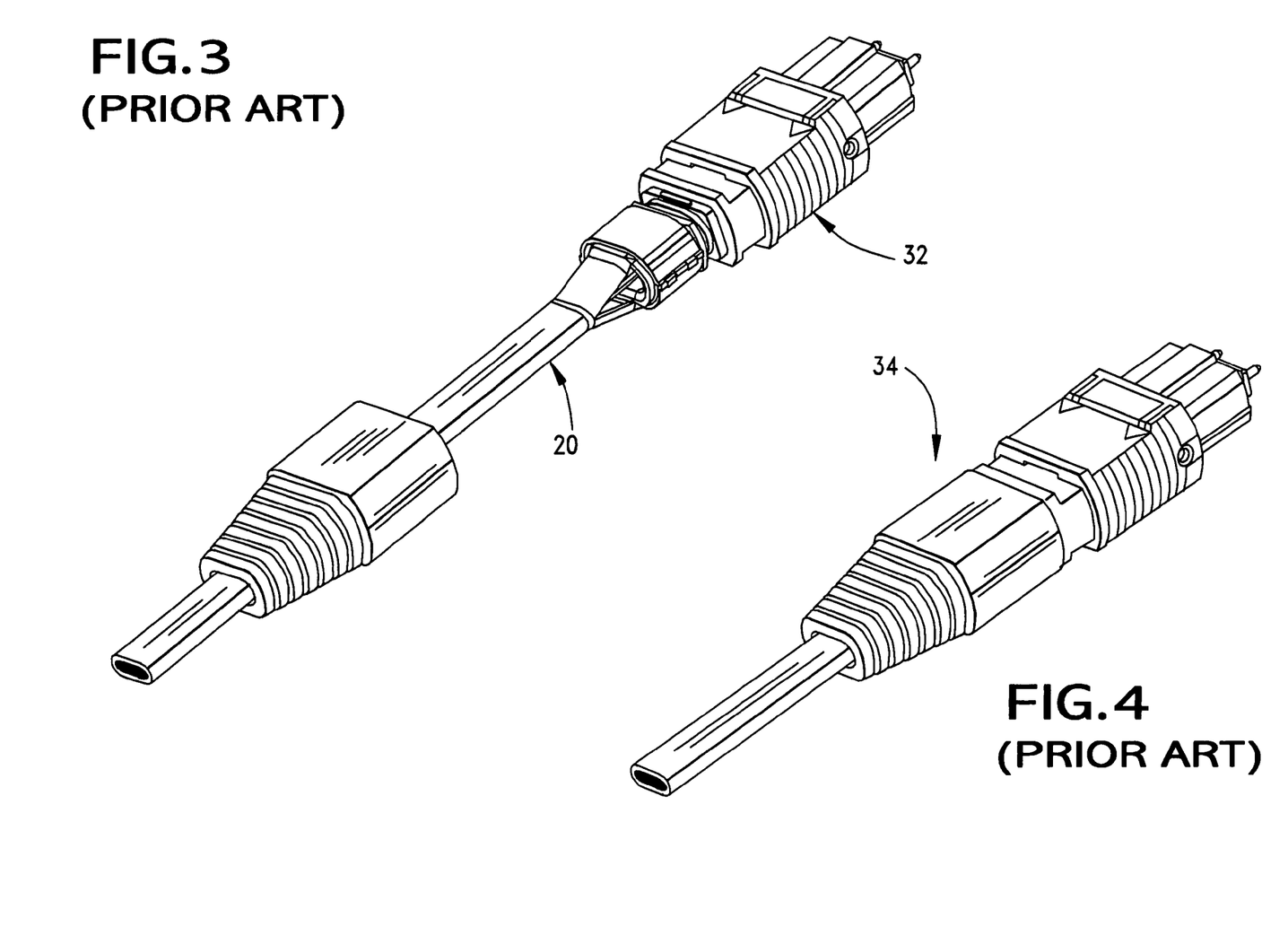

The ribbon cable 20 may be terminated directly with a multi-fiber connector 32, such as an MTO connector, by the termination process illustrated in FIGS. 2–4, in order to provide a flat cable assembly 34. The purpose of the illustrations in FIGS. 2–4 is to show how the ribbon cable 20 is attached to the connector 32. The details of the connector 32 assembling to the 12-fiber ribbons 22 of the ribbon cable 20 are not illustrated as they are well-known in the art. Alternatively, the ribbon cable 20 can be split into single fibers and then terminated with single fiber connectors, such as the SC type, as discussed and illustrated in U.S. Pat. No. 6,623,173, which is owned by the assignee of the present application. Techniques for single fiber cable termination are well established. The art of multi-fiber cable and termination are still evolving.

Flat cable assemblies have several disadvantages in cable routing. First, the flat cable assembly can only be bent along the flat side. Any attempt to bend the flat cable assembly in the other direction damages the ribbons. Second, when a flat cable assembly with more than one ribbon is bent in its only bendable direction, the outer ribbons are stretched and the inner ribbons are compressed. Since the ribbons are fixed to the connectors, the ribbons cannot slide along each other to reduce the stress resulting in potential ribbon damage or high attenuation. Third, the flat cable assembly has a low crush resistance since the jacket is thin and does not provide enough protection to the ribbons.

Figures 5, 6, 7:
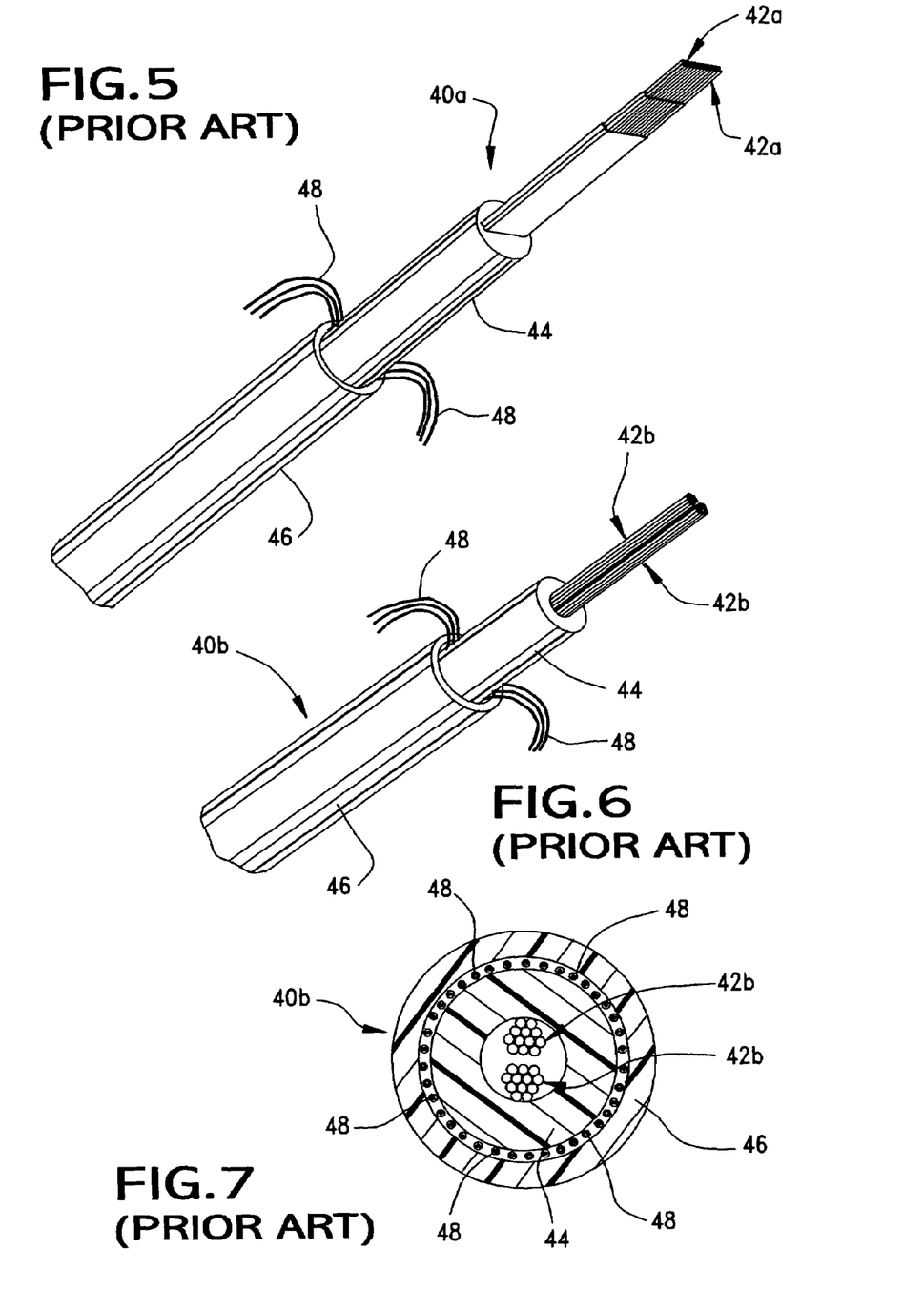
FIG. 5 is a perspective view of a first type of round cable of the prior art containing two 24-fiber ribbons.
FIG. 6 is a perspective view of a second type of round cable of the prior art containing two 12-fiber bundles.
FIG. 7 is a cross-sectional view of the second type of round cable illustrated in FIG. 6.

To overcome these disadvantages, round multi-fiber cables were recently introduced. One type of round multi-fiber cable 40a is illustrated in FIG. 5 and a second type of round multi-fiber cable 40b is illustrated in FIGS. 6 and 7. The round multi-fiber cable 40a contains two 24-fiber ribbons 42a and the round multi-fiber cable 40b contains two 12-fiber bundles 42b; the fibers in each bundle 42b are loosely contained by a string (not shown) wrapped in a helix along the length of the bundle 42b. Both the round multi-fiber cable 40a and the round multi-fiber cable 40b have a first jacket layer 44 and a second jacket layer 46. The strands 48 of strength members are sandwiched between the first and second jacket layers 44, 46. The double jacket construction makes the round multi-fiber cables 40a, 40b more crush resistant than flat cables. The round multi-fiber cable 40b in FIGS. 6 and 7 can be bent in any direction without causing significant strength to any particular fiber.

Although the round cable 40a in FIG. 5 is less resistant to bending than the round cable 40b in FIGS. 6 and 7, because the fibers in the round cable 40a are ribbonized, it is still much more improved in comparison to the flat cable 20, illustrated in FIG. 1. When the round cable 40a is bent in the narrow side of the ribbons 42a, the round cable 40a can roll gradually to twist the ribbons 42a inside the jackets 44, 46 to avoid the sharp bending stress in the ribbon 42a. This rolling effect is pre-built into the type of round multi-fiber cables discussed and illustrated in U.S. Pat. No. 6,295,401. In addition to these advantages, the round cables 40a, 40b have the feel of the traditional copper cables and are generally more friendly to handle and route than flat cables.

As round multi-fiber cables were only invented within the last few years, they have not been widely used in any practical application. It is believed that this is due, at least in part, because no technique has been established to terminate round multi-fiber cables to connectors. As round multi-fiber cables have two layers of jackets, they are harder to terminate. Round multi-fiber cables also cannot be attached to a connector in the same way as flat cables are attached to a connector because of at least two reasons. First, the existing connectors only accept a single jacket. Second, the connector components cannot fit over the round cable to give the required space for connector assembling.

The present invention thus provides a method of terminating a round multi-fiber cable with a connector that accepts ribbon cables in order to provide a solution to the aforementioned problems. The present invention further provides a round cable assembly which is formed by the method of the invention. Other features and advantages will become apparent upon reading the attached description of the invention, in combination with a study of the drawings.

OBJECTS AND SUMMARY OF THE INVENTION

A primary object of the present invention is to provide a method of terminating a round multi-fiber cable to a multi-fiber connector which accepts ribbon cables, in order to form a round multi-fiber cable assembly.

An object of the present invention is to provide a method which uses several relatively inexpensive parts to enable round multi-fiber cables to be processed such that the ends of the cables may be terminated to standard connectors that are normally intended for use with ribbon or flat cables.

An object of the present invention is to provide a round multi-fiber cable assembly which is resistant to damage when the cable is bent.

Another object of the present invention is to provide a round multi-fiber cable assembly which has a higher crush resistance than a flat multi-fiber cable assembly.

Yet another object of the present invention is to provide a round multi-fiber cable assembly which provides for the feel of traditional copper cables.

Still another object of the present invention is to provide a round multi-fiber cable assembly which is generally more friendly to handle and route than a flat multi-fiber cable assembly.

Briefly, and in accordance with the foregoing, a method of forming a round multi-fiber cable assembly is provided which includes the following steps: providing a round multi-fiber cable, a heat shrinkable tube, a tubing, a boot, a crimp tubing, and a multi-fiber connector; threading the heat shrinkable tube onto the multi-fiber cable; stripping off inner and outer jackets of the multi-fiber cable to pre-determined lengths; ribbonizing the fibers of the multi-fiber cable, if necessary; threading the fibers and strength members of the multi-fiber cable through the tubing; positioning a first end of the tubing around the round multi-fiber cable; positioning a second end of the tubing around the multi-fiber connector; placing the boot and the crimp tubing on the tubing, assembling the multi-fiber connector to the ribbon; crimping the crimp tubing around the tubing, the strength members and the multi-fiber connector; heat shrinking the heat-shrinkable tubing to the round multi-fiber cable and the tubing; and sliding the boot to attach it to the multi-fiber connector to provide a round multi-fiber cable assembly.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENTS

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

A method 100 of terminating a round multi-fiber cable 40a, 40b to a multi-fiber connector 32 which accepts ribbon cables 20, in order to form a round multi-fiber cable assembly 200, will now be discussed with regard to FIGS. 5–13D. The steps of the method 100 are best illustrated in FIGS. 13A–13D.

In step 102, either the round multi-fiber cable 40a or the round multi-fiber cable 40b is provided. The method 100 will be further discussed herein as though the round multi-fiber cable 40a has been provided. As illustrated in FIG. 5, the round multi-fiber cable 40a contains two 24-fiber ribbons 42a. Of course, it is to be understood that more or less fibers than the 24-fiber ribbons 42a could be provided. A first jacket layer 44 is wrapped around the ribbons 42a and a second jacket layer 46 is wrapped around the first jacket layer 44. Strands 48 of strength members, such as kevlar, are sandwiched between the first and second jacket layers 44, 46.

Figure 9:
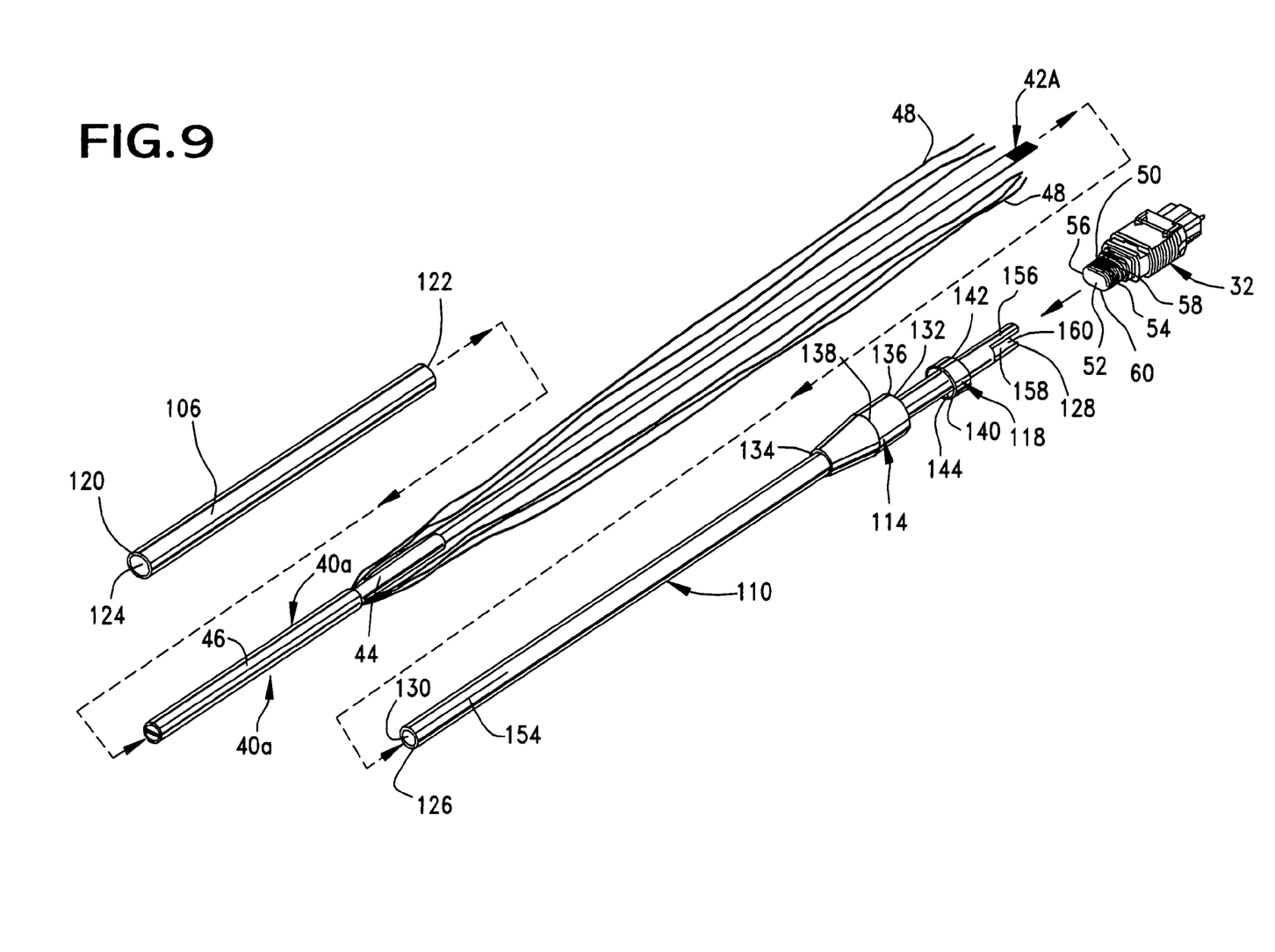

In steps 104, 108, 112 and 116, items necessary to the construction of the round multi-fiber cable assembly 200 are provided. Specifically, a heat shrinkable tube 106 (Step 104), a tubing 110 (Step 108), a boot 114 (Step 112), and a crimp tubing 118 (Step 116). The heat shrinkable tube 106, the tubing 110, the boot 114, and the crimp tubing 118 are best illustrated in FIG. 9. The heat shrinkable tube 106 is a generally cylindrical, flexible tube having a first end 120, a second end 122 and a passageway 124 which extends therethrough from the first end 120 thereof to the second end 122 thereof. The heat shrinkable tube 106 is preferably formed of a flexible, non-conductive material, such as heat shrinkable plastic. The tubing 110 is a generally cylindrical, flexible tube having a first end 126, a second end 128 and an passageway 130 which extends therethrough from the first end 126 thereof to the second end 128 thereof. The tubing 110 is preferably formed of a flexible, non-conductive material, such as plastic. The boot 114 has an passageway 132 extending therethrough from a first end 134 thereof to a second end 136 thereof. The passageway 132 of the boot 114 has a diameter at the first end 134 thereof which is smaller than a diameter of the passageway 132 at the second end 136. In the preferred embodiment, the boot 114 tapers from the first end 134 to generally the midpoint 138 of the boot 114. The boot 114 is generally cylindrical from the midpoint 138 to the second end 136 thereof, such that the passageway 132 is of a generally consistent diameter from the midpoint 138 to the second end 136. The boot 114 is preferably formed of a non-conductive material, such as plastic or rubber. The crimp tubing 118, in the uncrimped condition, is generally cylindrical and has a first end 140, a second end 142 and an passageway 144 which extends therethrough from the first end 140 thereof to the second end 142 thereof. The crimp tubing 118 is preferably formed of a crimpable material such as metal. The crimp tubing 118 is preferably not as long as either the heat shrinkable tube 106 or the tubing 110. The jacket 46 of the round multi-fiber cable 40a and the tubing 110 preferably have outer diameters which are generally identical to one another. The heat shrinkable tube 106 in its initial form, the boot 114, and the crimp tubing 118 in its initial form preferably have inner diameters which are greater than the outer diameters of the round multi-fiber cable 40a and the tubing 110.

In step 146, a multi-fiber connector 32 which is designed to accept ribbon cables 20 is provided. As shown in FIG. 9, the multi-fiber connector 32 has an end 50 which has an opening 52 for receiving the ribbons 22 of a ribbon cable 20. The end 50 is generally oval-shaped such that it has two, opposite rounded sides 54, 56, a relatively flat top side 58 and a relatively flat bottom side 60. The construction of such a multi-fiber connector 32 is well-known in the art and, therefore, will not be discussed further herein.

In step 148, the heat shrinkable tube 106 is positioned around the round multi-fiber cable 40a. This is not illustrated in FIGS. 9–11 for clarification purposes only. Were this to be shown, the second end 122 of the heat shrinkable tube 106 would be positioned around the round multi-fiber cable 40a such that the round multi-fiber cable 40a is positioned within the passageway 124 of the heat shrinkable tube 106. The first end 120 of the heat shrinkable tube 106 may also be positioned around the round multi-fiber cable 40a such that the round multi-fiber cable 40a extends through the passageway 124 of the heat shrinkable tube 106, or the first end 120 of the heat shrinkable tube 106 may not be positioned around the round multi-fiber cable 40a such that the round multi-fiber cable 40a does not extend entirely through the passageway 124 of the heat shrinkable tube 106.

In step 150, the inner and outer jackets 44, 46 of the round multi-fiber cable 40a are stripped off to predetermined lengths as best illustrated in FIG. 9. The predetermined lengths at which the inner and outer jackets 44, 46 are stripped off would not extend as far as to where the second end 122 of the heat shrinkable tube 106 is positioned around the round multi-fiber cable 40a.

Thereafter, the tubing 110 is prepared in step 152 by sub-steps 152a and 152b. In sub-step 152a, a first end 126 of the tubing 110 is split to provide a slit 154, as illustrated in FIG. 9, so that the tubing 110 will fit over the inner jacket 44 and/or the outer jacket 46 of the round multi-fiber cable 40a, while leaving an adequate length of the unslit tubing 110 for the remaining steps in the method 100 to be performed. In sub-step 152b, a second end 128 of the tubing 110 is cut, as illustrated in FIG. 9, to provide a top extending portion 156 having a predetermined length and width, a bottom extending portion 158 having a predetermined length and width, and a pair of cut-out openings 160 (only one of which is illustrated in FIGS. 9 and 10) which are provided between the top and bottom extending portions 156, 158.

Figures 10, 11:
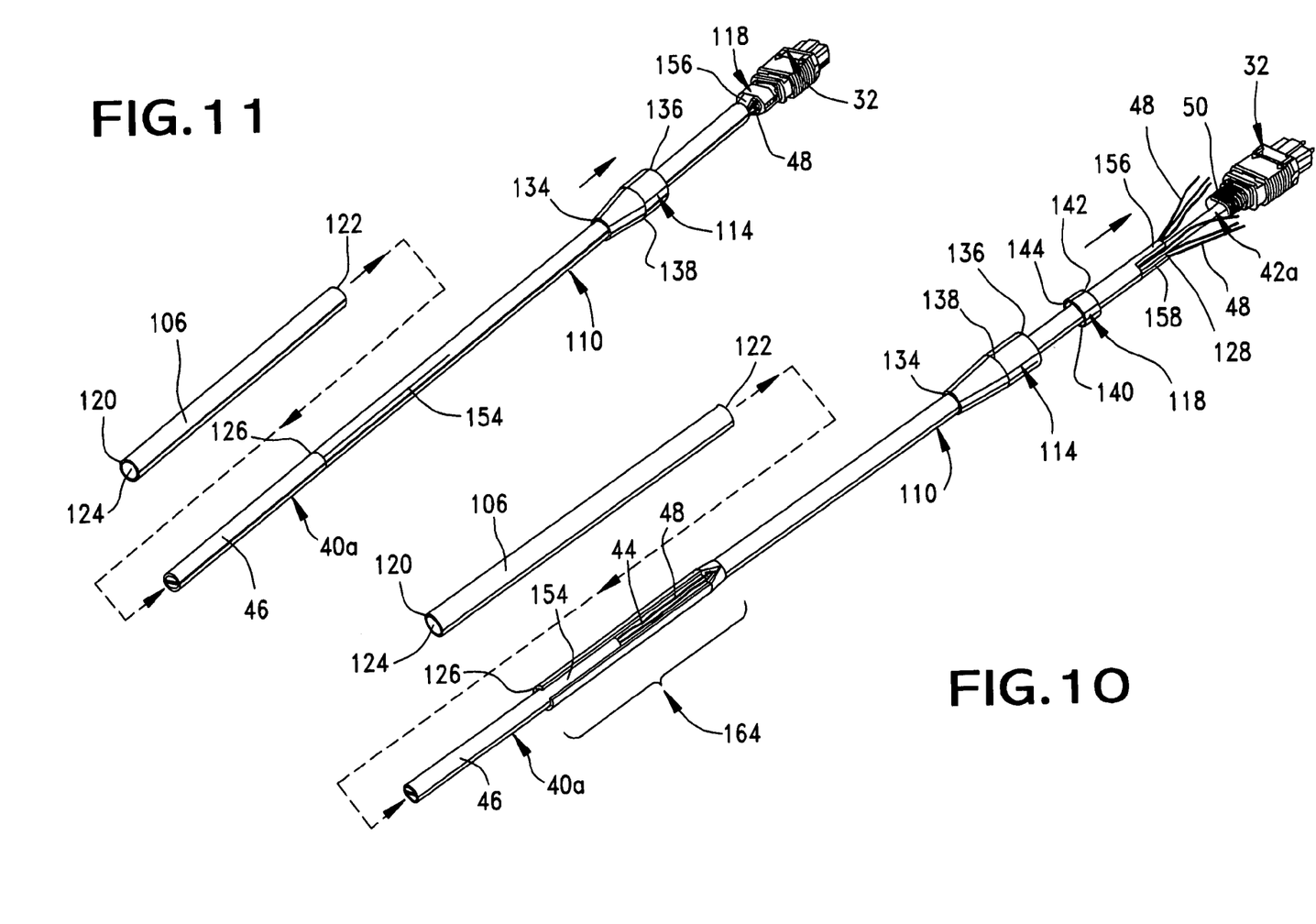
Figure 13A:
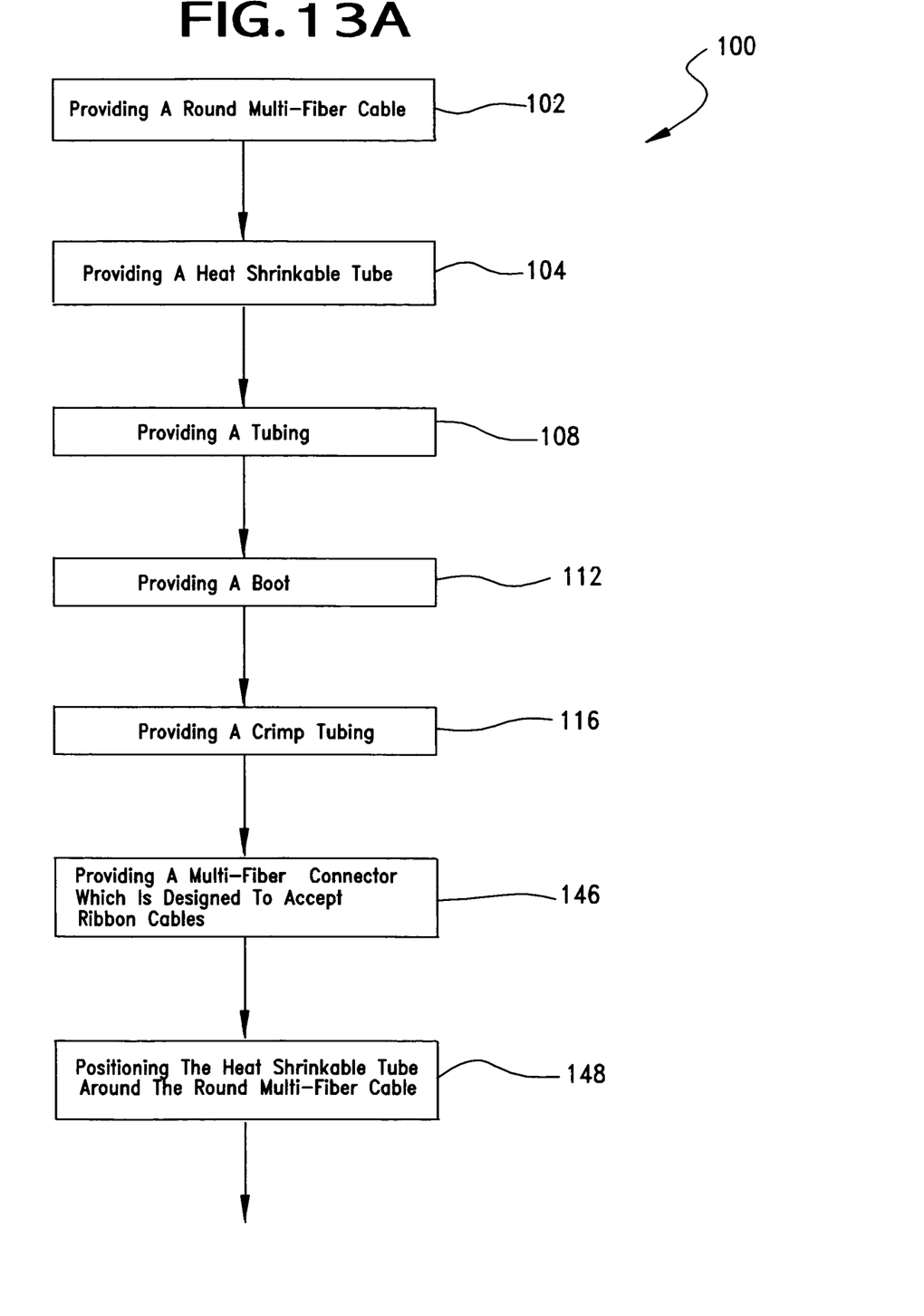
FIGS. 13A–13D are a flow chart illustrating the steps of the method of terminating a round multi-fiber cable to a multi-fiber connector which accepts ribbon cables, in order to form a round multi-fiber cable assembly of the present invention.
Figure 13B:
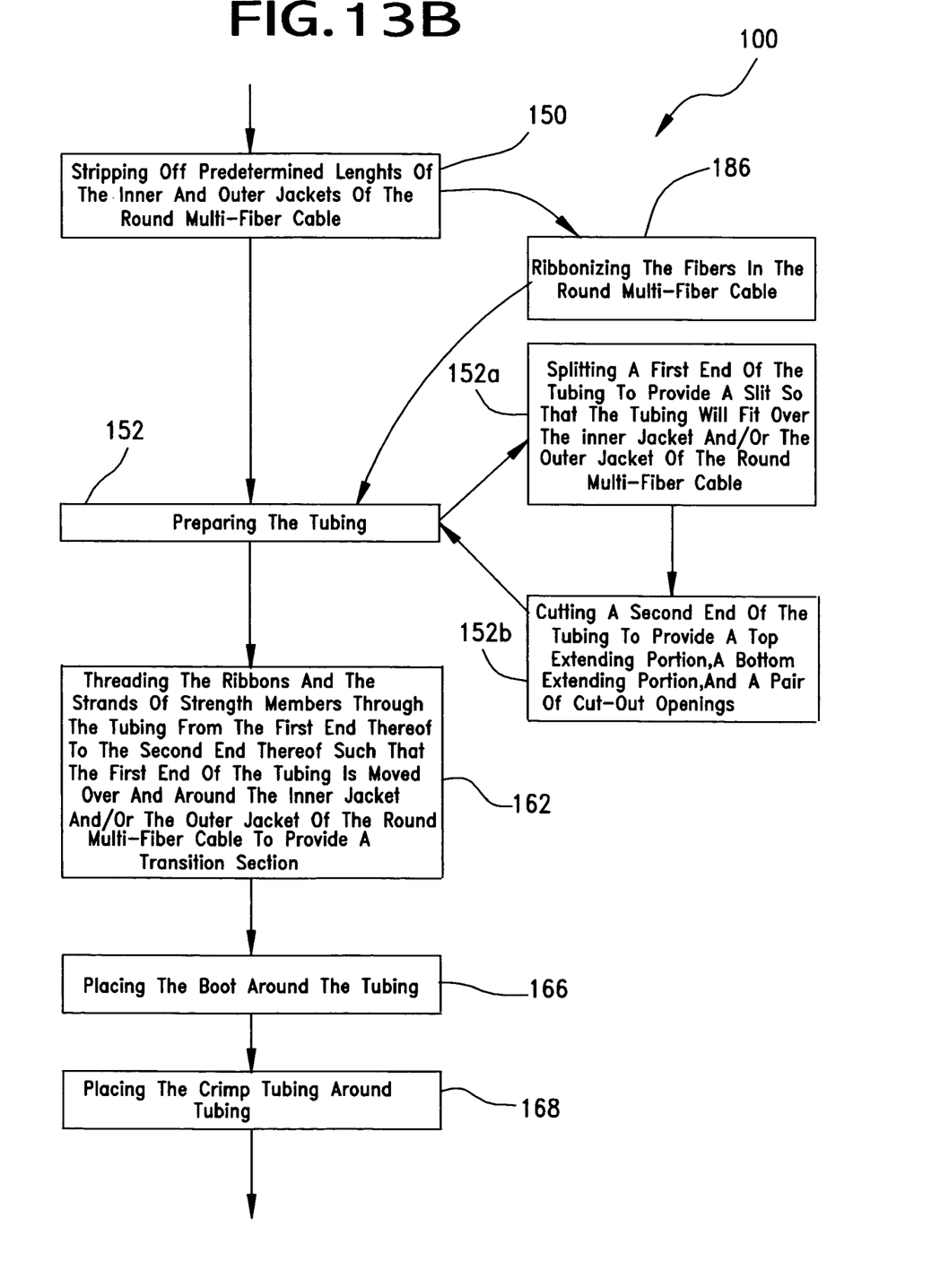
Figure 13C:
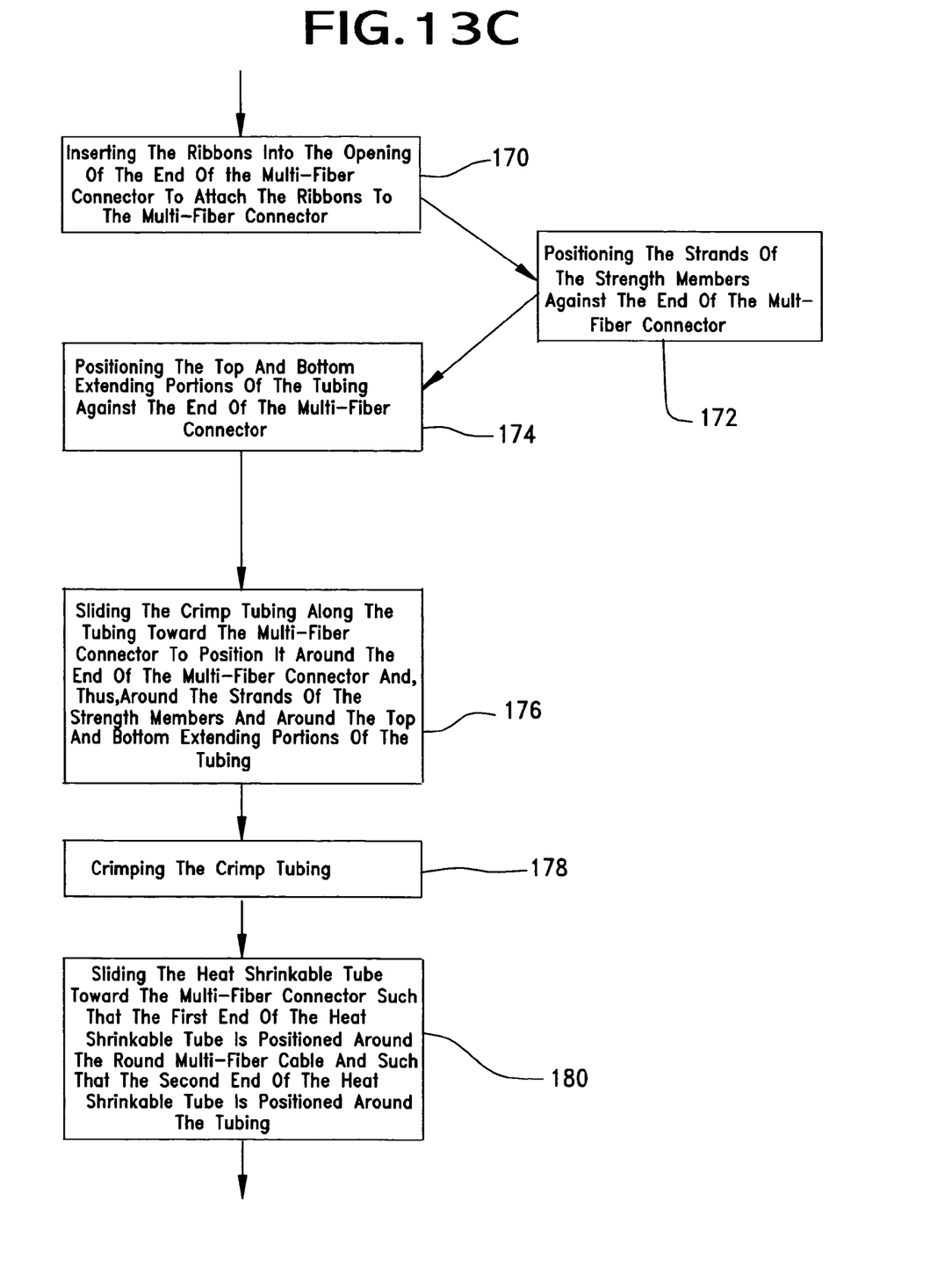
Figure 13D:
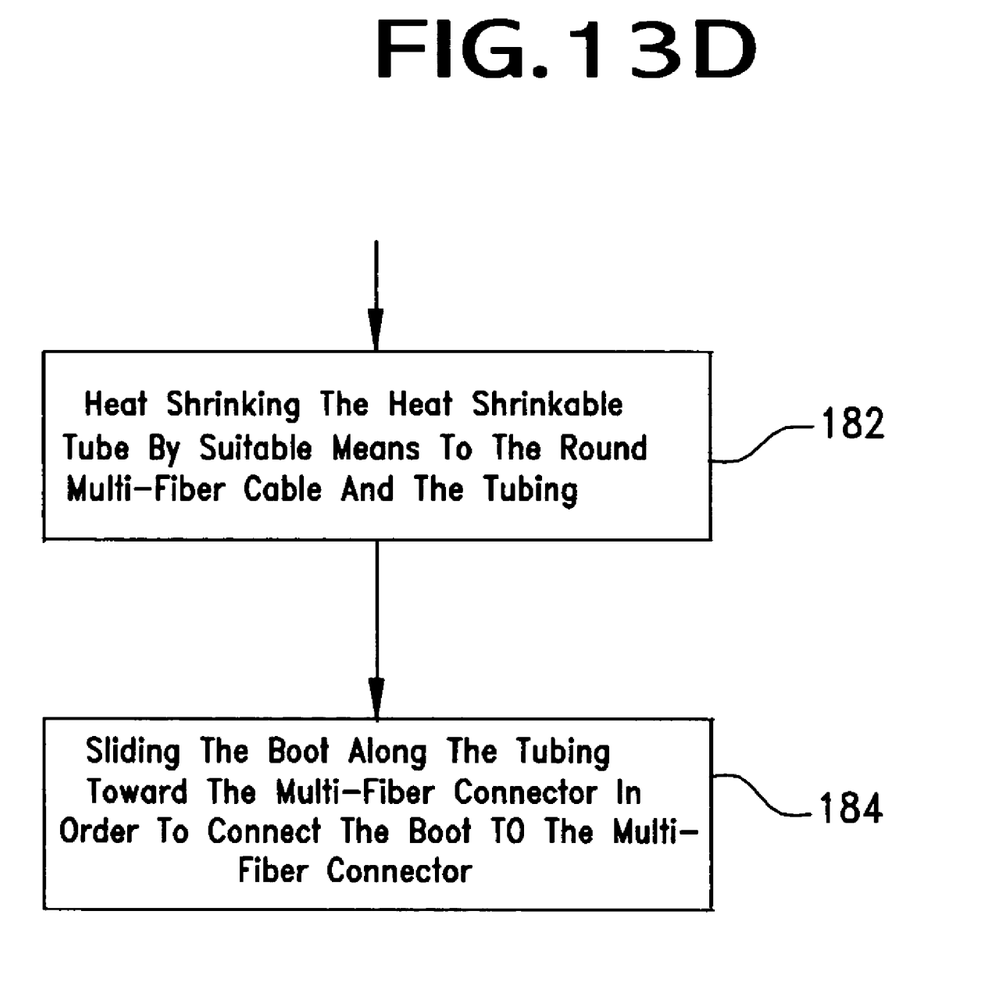

Next, in step 162, the ribbons 42a and the strands 48 of strength members are threaded through the tubing 110 from the first end 126 thereof to the second end 128 thereof such that the first end 126 of the tubing 110 is moved over and around the inner jacket 44 and/or the outer jacket 46 of the round multi-fiber cable 40a to provide a transition section 164, as illustrated in FIG. 10. At this point, the ribbons 42a and the strands 48 of strength members still extend beyond the second end 128 of the tubing 110, as illustrated in FIG. 10. The first end 126 of the tubing 110 can be moved over and around the inner jacket 44 and the outer jacket 46 of the round multi-fiber cable 40a because of the slit 154 provided at the first end 126 of the tubing 110 which allows the tubing 110 to expand at the slit 154 in order to fit over the inner jacket 44 and the outer jacket 46 of the round multi-fiber cable 40a. The first end 126 of the tubing 110 preferably extends over the round multi-fiber cable 40a such that it is positioned proximate to the second end 122 of the heat shrinkable tubing 106.

In step 166, the boot 114 is placed around the tubing 110 by moving the ribbons 42a and the strands 48 of strength members through the passageway 132 of the boot 114 and moving the top and bottom extending portions 156, 158 at the second end 128 of the tubing 110 through the passageway 132 of the boot 114, both from the first end 134 to the second end 136 thereof, such that the boot 114 is positioned around the unslit tubing 110 between the first end 126 and the second end 128 of the tubing 110. It should be noted that the boot 114 is illustrated as being around the tubing 110 in FIG. 9, without the ribbons 42a and the strands 48 of strength members being threaded through the tubing 110, as it is possible to perform step 166 before performing step 162, such that the ribbons 42a and strands 48 of strength members need not be moved through the passageway 132 of the boot 114. As such, the boot 114 could be placed around the tubing 110 from either the first end 126 thereof or the second end 128 thereof. In fact, if desired, step 166 could be performed before step 152 as well.

In step 168, the crimp tubing 118 is placed around the tubing 110 by moving the ribbons 42a and strands 48 of strength members through the passageway 144 of the crimp tubing 118 and moving the top and bottom extending portions 156, 158 at the second end 128 of the tubing 110 through the passageway 144 of the crimp tubing 118, both from the first end 140 thereof to the second end 142 thereof, such that the crimp tubing 118 is positioned around the unslit tubing 110 between the first end 126 of the tubing 110 and the second end 128 of the tubing 110. The crimp tubing 118 is placed around the tubing 110 such that it is closer to the second end 128 of the tubing 110 than is the boot 114 which is placed around the tubing 110, as illustrated in FIG. 10. It should be noted that the crimp tubing 118 is illustrated as being around the tubing 110 in FIG. 9, without the ribbons 42a and the strands 48 of strength members being threaded through the tubing 110, as it is possible to perform step 168 before performing step 162, such that the ribbons 42a and strands 48 of strength members need not be moved through the passageway 144 of the crimp tubing 118. As such, the crimp tubing 118 could be placed around the tubing 110 from either the first end 126 thereof or the second end 128 thereof. In fact, if desired, step 168 could be performed before step 152 as well. However steps 166 and 168 are performed, though, the crimp tubing 118 is always ultimately positioned between the boot 114 and the second end 128 of the tubing 110 and the boot 114 is always positioned between the first end 126 of the tubing 110 and the crimp tubing 118.

In step 170, ribbons 42a which extend beyond the second end 128 of the tubing 110 are inserted into the opening 52 of the multi-fiber connector 32 to attach the ribbons 42a to the multi-fiber connector 32, as illustrated in FIG. 10.

In step 172, the strands 48 of the strength members which extend beyond the second end 128 of the tubing 110 are positioned against the end 50 of the multi-fiber connector 32. The strands 48 can be positioned against any one of the sides 54, 56, 58, 60 of the end 50 of the multi-fiber connector 32.

In step 174, the top and bottom extending portions 156, 158 of the tubing 110 are positioned against the end 50 of the multi-fiber connector 32 by sliding the tubing 110 toward the multi-fiber connector 32. In sliding the tubing 110 toward the multi-fiber connector 32, the first end 126 of the tubing 110 is also moved toward the multi-fiber connector 32 such that the first end 126 of the tubing 110 is moved over only the inner jacket 44 of the round multi-fiber cable 40a and preferably abuts against the outer jacket 46 of the round multi-fiber cable 40a, as illustrated in FIG. 11, thus allowing the tubing 110 to not be expanded at the slit 154 and thus removing the transition section 164. The top extending portion 156 of the tubing 110 is positioned against the top side 58 of the end 50 of the multi-fiber connector 32 and the bottom extending portion 158 of the tubing 110 is positioned against the bottom side 60 of the end 50 of the multi-fiber connector 32 such that the end 50 of the multi-fiber connector 32 is positioned within the cut-out openings 160 provided at the second end 128 of the tubing 110. The top and bottom extending portions 156, 158 of the tubing 110 may be positioned around some or all of the strands 48 of the strength members.

In step 176, the crimp tubing 118 is slid along the tubing 110 toward the multi-fiber connector 32 to position it around the end 50 of the multi-fiber connector 32 and, thus, around the strands 48 of the strength members and around the top and bottom extending portions 156, 158 of the tubing 110. The crimp tubing 118 thus has a diameter which is large enough to fit around the end 50 of the multi-fiber connector 32, the strands 48 of the strength members, and the top and bottom extending portions 156, 158 of the tubing 110. The crimp tubing 118 is crimped in step 178 by suitable means. The crimping sandwiches the top and bottom extending portions 156, 158 of the tubing 110 and the strands 48 of the strength members between the crimp tubing 118 and the end 50 of the multi-fiber connector 32 to secure same together, as illustrated in FIG. 11.

Next, in step 180, the heat shrinkable tube 106 is slid toward the multi-fiber connector 32 such that the first end 120 of the heat shrinkable tube 106 is positioned around the round multi-fiber cable 40a and such that the second end 122 of the heat shrinkable tube 106 is positioned around the tubing 110, between where the slit 154 is provided on the tubing 110 and the second end 128 of the tubing 110, and preferably between where the slit 154 is provided on the tubing 110 and where the first end 134 of the boot 114 is positioned around the tubing 110.

Figures 8, 12:
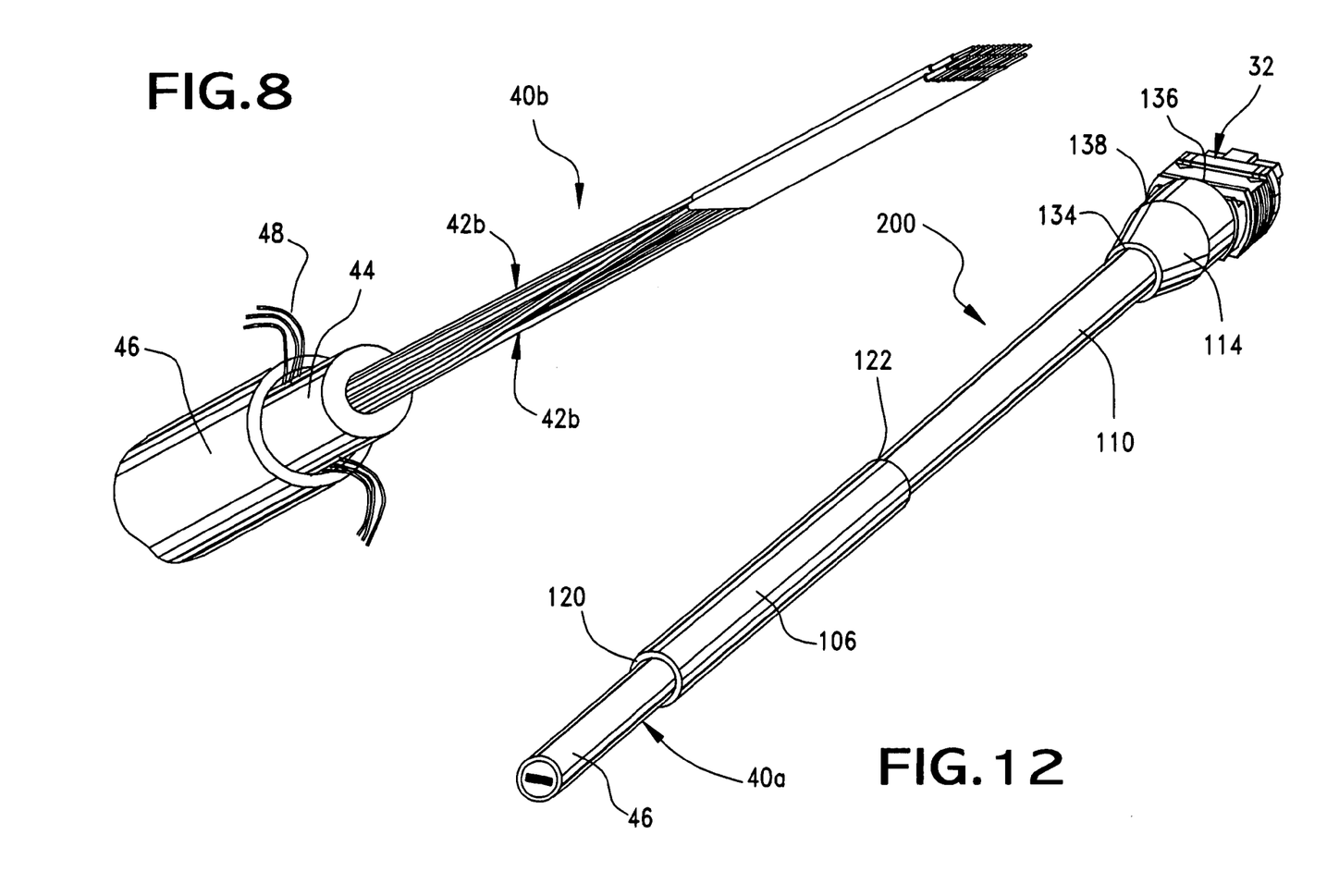
FIG. 8 is a perspective view of the second type of round cable illustrated in FIG. 6 having its fibers ribbonized in accordance with the present invention.
FIGS. 9–12 are perspective views of the first type of round cable illustrated in FIG. 5 being terminated with a multi-fiber connector to form a round cable assembly in accordance with the present invention.

Once the heat shrinkable tube 106 is properly positioned from step 180, the heat shrinkable tube 106 is heat shrinked by suitable means to the round multi-fiber cable 40a and the tubing 110 in step 182, in order to secure the round multi-fiber cable 40a to the tubing 110, as illustrated in FIG. 12.

Thereafter, the boot 114 is slid along the tubing 110 toward the multi-fiber connector 32 in step 184. This connects the boot 114 to the connector 32 in a manner known in the art, such as by an interference fit, as illustrated in FIG. 12 to form the round multi-fiber cable assembly 200. The boot 114 covers the crimp tubing 118 in order to protect the securement of the crimp tubing 118, the top and bottom extending portions 156, 158 of the tubing 110, the strands 48 of the strength members, and the end 50 of the multi-fiber connector 32.

Thus, the method 100 provides a round multi-fiber cable assembly 200. The round multi-fiber cable 40a of the round multi-fiber cable assembly 200 can be bent in any direction, thus providing a reduction in the amount of damage which can be caused to a flat cable assembly which utilizes a flat cable, which can only be bent along the flat side. The round multi-fiber cable assembly 200 has a higher crush resistance than does a flat multi-fiber cable assembly because it has both the inner and outer jackets 44, 46, rather than just a single jacket. In addition, the round multi-fiber cable assembly 200 provides for the feel of the traditional copper cables as they are round, rather than flat. Furthermore, the round multi-fiber cable assembly 200 is generally more friendly to handle and route than is a flat multi-fiber cable assembly because it can be bent in any direction. Additionally, the round multi-fiber cable assembly 200 allows for round multi-fiber cables to be widely used in practical applications as they, more than likely, already make use of multi-fiber connectors 32 and will, thus, be able to obtain all of the benefits that a round multi-fiber cable provides.

If, in step 102, the round multi-fiber cable 40b was provided, rather than the round multi-fiber cable 40a, an extra step 186 is involved in the method 100. As illustrated in FIGS. 6 and 7, the round multi-fiber cable 40b contains two 12-fiber bundles 42b. Of course, it is to be understood that more or less fibers than the 12-fiber bundles 42b could be provided. The fibers in each bundle 42b are loosely contained by strings (not shown) wrapped in a helix along the length of each bundle 42b. A first jacket layer 44 is wrapped around the bundles 42b and a second jacket layer 46 is wrapped around the first jacket layer 44. Strands 48 of strength members, such as kevlar, are sandwiched between the first and second jacket layers 44, 46.

In step 186, the fibers in each bundle 42b are ribbonized near an end of the round multi-fiber cable 40b, as illustrated in FIG. 8. Once the fibers in each bundle 42b of the round multi-fiber cable 40b are ribbonized, the round multi-fiber cable 40b may be treated in exactly the same manner as the round multi-fiber cable 40a. Therefore, the method 100 will not be re-described or re-illustrated with regard to the multi-fiber cable 40b, as it is to be understood that the method 100 with regard to the multi-fiber cable 40a is identical to the method 100 with regard to the multi-fiber cable 40b, except that the method 100 with regard to the multi-fiber cable 40b further includes the step 186.

It is further to be understood that the order or sequence of the method 100 may be different than that as described herein where feasible such that the sequence or order of operation of the method 100 as described and as illustrated in FIGS. 13A–13D is not the only order or sequence in which the method 100 can be performed in order to provide the round multi-fiber cable assembly 200 of the invention.

It should be noted that each of the heat shrinkable tube 106, the tubing 110, the boot 114, and the crimp tubing 118 could be in forms other than those as described and illustrated herein. For example, any one of these items could be a flat piece of material which is wrapped around into a tube-like structure and secured either to itself to properly position and secure same, or secured to another item to properly position and secure same. More specifically, the heat shrinkable tube 106 could be a flat piece of material which is wrapped around the round multi-fiber cable 40a and the tubing 110 and heat shrunk in order to secure the heat shrinkable tube 106, the multi-fiber cable 40a and the tubing 110 together. Thus, it should be apparent that each of these items are described as tubes or tube-like structures as in the case of the boot 114, but could be initially provided in other structures or configurations so long as at the end of the method 100, they are all preferably in the general form of a tube or the like.

While preferred embodiments of the present invention are shown and described, it is envisioned that those skilled in the art may devise various modifications of the present invention without departing from the spirit and scope of the appended claims.

The invention claimed is:

1. A round multi-fiber cable assembly comprising:
   a round multi-fiber cable, wherein said round multi-fiber cable includes a plurality of fibers, a first jacket layer wrapped around said plurality of fibers, a second jacket layer wrapped around said first jacket layer, and a plurality of strength members sandwiched between said first and second jacket layers, said first and second jacket layers being stripped off at said first end of said round multi-fiber cable to expose said plurality of fibers and said plurality of strength members;
   a connector configured to receive a flat multi-fiber cable; and
   means for connecting said round multi-fiber cable to said connector, wherein said connecting means includes a heat shrinkable member, a crimp member, and a member, said member having first and second ends, said first end of said member configured to fit over at least one of said first and second jacket layers of said round multi-fiber cable, said second end of said member configured to connect to said connector, said heat shrinkable member being heat shrunk over a portion of said round multi-fiber cable and said member in order to secure said round multi-fiber cable to said member, said crimp member being crimped over said second end of said member in order to secure said member to said end of said connector.

2. A round multi-fiber cable assembly as defined in claim 1, wherein said exposed plurality of fibers are ribbonized at said first end of said round multi-fiber cable.

3. A round multi-fiber cable assembly as defined in claim 1, wherein said heat shrinkable member, said crimp member and said member are generally in the form of a tube.

4. A round multi-fiber cable assembly as defined in claim 1, further including a boot, said boot being positioned around said crimp member and being attached to said connector.

5. A round multi-fiber cable assembly as defined in claim 1, wherein said first end of said member is provided with a slit, said slit being configured to assist in fitting said first end of said member over said at least one of said first and second jacket layers of said round multi-fiber cable.

6. A round multi-fiber cable assembly as defined in claim 1, wherein said end of said connector has a generally flat top side and a generally flat bottom side, said second end of said member having a top extending portion and a bottom extending portion, said top extending portion being positioned over said generally top flat portion of said end of said connector, said bottom extending portion being positioned under said generally bottom flat portion of said end of said connector.

7. A round multi-fiber cable assembly as defined in claim 6, wherein at least one of said exposed plurality of strength members is positioned between said top extending portion of said member and said generally flat top portion of said end of said connector.

8. A round multi-fiber cable assembly as defined in claim 6, wherein at least one of said exposed plurality of strength members is positioned between said bottom extending portion of said member and said generally flat bottom portion of said end of said connector.

9. A method of terminating a round multi-fiber cable to a connector configured to receive a flat multi-fiber cable, said method comprising the steps of:
a) providing a round multi-fiber cable which has a plurality of fibers, a first jacket layer wrapped around said plurality of fibers, a second jacket layer wrapped around said first jacket layer, and a plurality of strength members sandwiched between said first and second jacket layers;
b) placing a heat shrinkable member onto the round multi-fiber cable;
c) stripping off inner and outer jackets of the round multi-fiber cable in order to expose a predetermined length of the plurality of fibers and the plurality of strength members;
d) providing a member having a first end, a second end, and an passageway which extends therethrough from said first end thereof to said second end thereof;
e) providing a slit in said first end of the member;
f) positioning said slit first end of said member over at least one of said inner and outer jackets of the round multi-fiber cable;
g) cutting a second end of said member in order to provide a top extending portion and a bottom extending portion;
h) passing said exposed plurality of fibers and said exposed plurality of strength members through said member from said first end thereof to said second end thereof;
i) placing a boot around said member;
j) placing a crimp member around said member;
k) providing a connector configured to receive a flat multi-fiber cable having an opening at an end thereof, said end having a top side and a bottom side;
l) inserting ends of said exposed plurality of fibers into said opening of said end of said connector in order to connect said plurality of fibers to said connector;
m) positioning ends of said exposed plurality of strength members against said end of said connector;
n) positioning said top extending portion over a top side of said end of said connector;
o) positioning said bottom extending portion under a bottom side of said end of said connector;
p) sliding said crimp member along said member toward said connector in order to position said crimp member around said top and bottom extending portions of said member;
q) crimping said crimp member, thereby sandwiching said top and bottom extending portions of said member and said ends of said exposed plurality of strength members between said crimp member and said end of said connector;
r) heat shrinking said heat shrinkable member to said round multi-fiber cable and said member in order to secure said round multi-fiber cable to said member; and
s) sliding said boot along said member and over said crimp member in order to connect said boot to said connector.

* * * * *